United States Patent [19]
Gilmour

[11] Patent Number: 6,114,960
[45] Date of Patent: Sep. 5, 2000

[54] METHOD AND APPARATUS FOR AN INTEGRATED SECURITY DEVICE PROVIDING FOR AUTOMATIC DISABLEMENT

[75] Inventor: Richard Joseph Gilmour, Liberty Hill, Tex.

[73] Assignee: International Business Machines Corporation, Armonk, N.Y.

[21] Appl. No.: 09/185,822

[22] Filed: Nov. 4, 1998

[51] Int. Cl.⁷ ............................................. G08B 13/14
[52] U.S. Cl. .................. 340/571; 340/825.32; 368/107; 368/109
[58] Field of Search .................. 340/571, 568.1, 340/568.7, 825.3, 825.31, 825.34, 825.32; 368/107, 108, 109

[56] References Cited

U.S. PATENT DOCUMENTS

| | | | |
|---|---|---|---|
| 4,626,106 | 12/1986 | Hooper | 368/107 |
| 4,814,901 | 3/1989 | Onishi et al. | 386/46 |
| 5,184,066 | 2/1993 | McEachern et al. | 324/73.1 |
| 5,530,895 | 6/1996 | Enstrom | 710/9 |
| 5,550,551 | 8/1996 | Alesio | 342/457 |
| 5,838,959 | 11/1998 | Thomann et al. | 713/600 |
| 5,969,433 | 10/1999 | Maggiora et al. | 307/10.5 |

*Primary Examiner*—Edward Lefkowitz
*Attorney, Agent, or Firm*—Casimer K. Salys; Felsman, Bradley, Vaden, Gunter & Dillon, LLP

[57] ABSTRACT

In electronic devices containing microprocessors, including data processing systems, logic is loaded to storage registers within a microprocessor or other suitable non-volatile storage medium during the manufacturing process. The logic provides for detecting the presence of a battery employed to power an interval timer. Also, the logic provides pre-set time intervals that operate in conjunction with the interval timer and existing or installed device state sensing devices. One time interval provides a warning to a user that the protected device will be deactivated within a specified period of time if a preset authorization code is not entered into the device. Another interval is provided to carry out deactivation if the preset code is not entered. Types of automatic deactivation include: partial deactivation, which comprises allowing communication via modem with a service center to obtain authorization; fully deactivated state requiring entry of a key code to reactivate the device and destructive deactivation which destroys circuits within the device necessary to operation.

15 Claims, 3 Drawing Sheets ical Field

The present invention relates in general to electronic devices, including data processing systems and in particular to preventing unauthorized use of the electronic devices. More particularly, the present invention relates to providing automatic disabling of electronic devices if use of the device is unauthorized.

2. Description of the Related Art

For national security reasons, the United States limits export of high-technology content equipment to unfriendly nations. One reason for limiting the exports is that the equipment and/or its technological content may be used against the United States in the development and production of weapons of mass destruction and delivery systems for those weapons. Agents of friendly and unfriendly nations have at times conspired to circumvent laws of the United States to provide such equipment to unfriendly nations with some degree of success.

Today, we are usually limited by the ability of authorities to discover the theft of, or determine whether improper usage of, high-technology content equipment has occurred. The government of the United States has passed laws that generally add restrictions to sale of such equipment to friendly and unfriendly nations. Theft of such equipment is always a peril and law enforcement agencies are usually the most effective tool to recover that equipment. The above described methods have proven to be less than fool-proof because it is difficult to identify when, where and by what means the stolen equipment may be recovered or prevented from being used.

External to the borders of the United States and its territories, we are limited by laws of other nations, their treaties with the United States and the intentions of those in power at any given time. Often we are powerless to identify where equipment is, what the equipment is being used for and powerless to recover the equipment. Theft of highly portable electronic devices such as laptop computers and cell phones is a great problem. Theft deterrent is not often applied to these items because of cost and ignorance of the necessity of security. Unauthorized use of many computers may be limited by password protection or removable disk drives, but this provides a limited level of security and is easily thwarted by knowledgeable personnel.

It would be desirable therefore, to provide a method and apparatus that would automatically disable new or used high technology equipment that has gotten into the wrong hands. The method and apparatus would not require installation by the owner or user of the electronic device/equipment. Also, the method and apparatus should provide for subsequent disablement of stolen equipment if owners of the equipment changed from friendly to unfriendly. Further, it would be desirable to have the ability to apply the method and apparatus to a variety of devices including computers, cellular phones and weapons systems.

SUMMARY OF THE INVENTION

It is therefore one object of the present invention to provide a method and apparatus that would automatically disable high technology equipment unless proper authorization is recognized.

It is another object of the present invention to provide a method and apparatus for subsequent disablement of stolen equipment or if owners of the equipment changed from friendly to unfriendly attitudes toward the United States.

It is yet another object of the present invention to provide a method and apparatus for automatic disablement that is applicable to a variety of devices including computers, cellular phones and weapons systems.

The foregoing objects are achieved as is now described. In electronic devices containing microprocessors, including data processing systems, logic is loaded to storage registers within a microprocessor or other suitable non-volatile storage medium during the manufacturing process. The logic provides for detecting the presence of a battery employed to power an interval timer. Also, the logic provides pre-set time intervals that operate in conjunction with the interval timer and existing or installed device state sensing devices. One time interval, a warning interval, provides a warning to a user that the protected device will be deactivated within a specified period of time if a preset authorization code is not entered into the device. Another interval, a time-out interval, is provided to carry out deactivation if the preset code is not entered. Types of automatic deactivation include: partial deactivation, which comprises allowing communication via modem with a service center to obtain authorization; fully deactivated state requiring entry of a key code to reactivate the device and destructive deactivation which destroys circuits within the device necessary for operation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
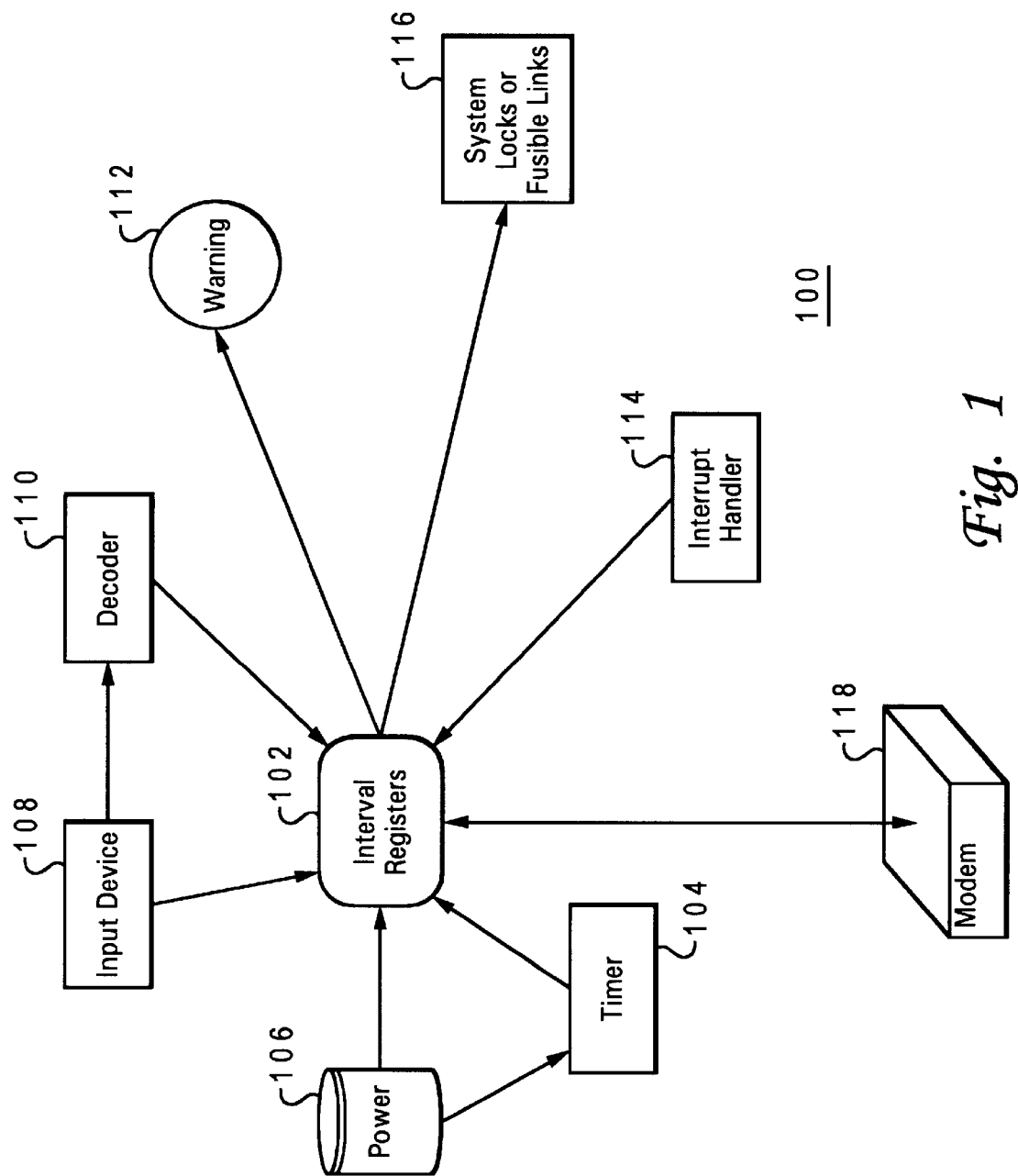
FIG. 1 depicts a high-level diagram of a data processing system in which a preferred embodiment of the present invention may be implemented.

With reference now to the figures, and in particular with reference to FIG. 1, a very high-level diagram of a data processing system in which a preferred embodiment of the present invention may be implemented, is depicted. Alternatively, in place of data processing system 100, other microprocessor based systems or devices may be protected such as cellular phones, weapons systems and satellites. In the present invention, data processing system 100 includes a microprocessor (not shown, interval registers 102, interval timer 104, self contained power unit ("battery") 106, input device 108, decoder 110, warning device 112, system lock or fusible links 116, interrupt handler 114 and modem 118. The various blocks displayed within data processing system 100 are only portions of data processing system 100 and are presented here for illustrative purposes only.

Interval timer 104 is installed and activated at the factory and is battery 106 powered for uninterrupted operation. If battery 106 is removed, circuitry and logic sensing this condition will initiate an interrupt causing interrupt handler 114 to set the system in a pre-defined, disablement state. Interval registers 102 are storage registers that may be within the microprocessor of the protected device, in this case data processing system 100, that may be signaled by interrupt handler 114. Logic stored within the registers would initiate system locks 118 if the pre-defined state was partial or total shutdown. If the pre-defined state was a non-recoverable disablement, interval registers 102 would initiate and complete destructive procedures that would activate fusible links 118 (a circuit component that when subjected to a relatively high current, break or open up) and destroy circuits necessary for system operation.

Logic, providing for pre-set disablement and warning signals, is entered into interval registers 102 during system manufacture utilizing input device 108. The logic also provides a pre-set time interval beginning with the completion of system manufacture and extending through delivery and setup at a customer's installation. Additionally, interval timer 104 is battery powered and is installed during manufacture of the device. Interval timer 104 is activated at completion of the manufacturing process. Before the initial time interval has expired, interval timer 104 and interval periods provided by the logic may be reset by a user entering a code through input device 108 which is decoded by decoder 110. A procedure would include a purchaser of the system (computer, cell phone, etc.) receiving an authorization code ("key") at the time of purchase. The purchaser would then enter the authorization key to reset the timer. If the purchaser does not enter the key in a timely manner and the initial period expires, a warning may be issued through warning device 112 (audio or display). If the purchaser neglects to enter the key after the initial warning, the logic disables the device when interrupt handler 114 signals interval registers 102 and initiates disablement.

By installing logic that prompts the user to take action to continue operation, automatic disablement is assured unless the user reacts on time. If the device is in the hands of an unauthorized user, the code to continue operation is not available and the system shuts down automatically. Devices in the hands of users that are no longer friendly to the United States automatically disable upon expiration of the critical time interval. Removal of the timer or attempts to deactivate the protection, automatically disable the device.

Figure 1A:
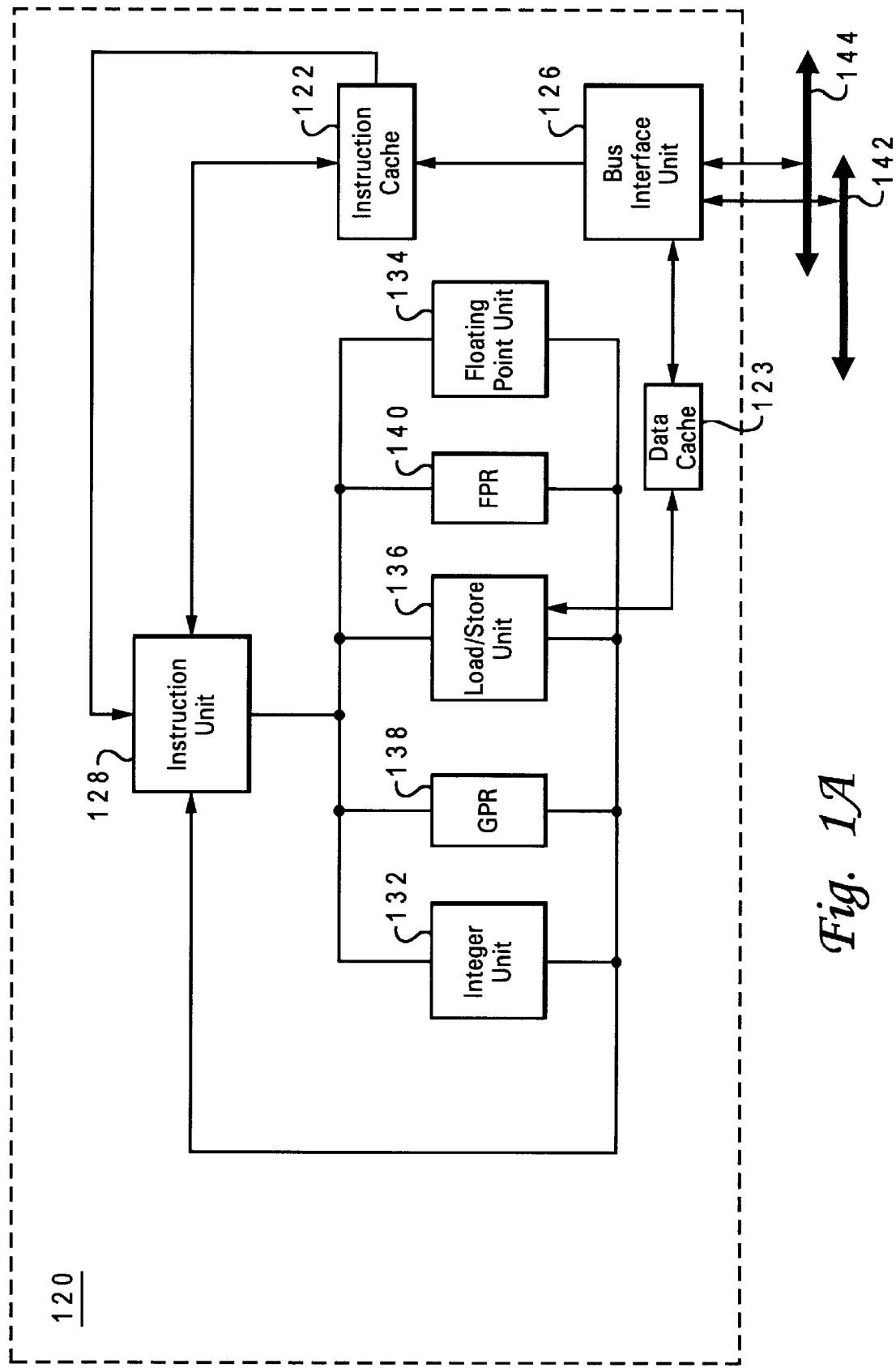
FIG. 1a illustrates a high-level block diagram of a microprocessor in accordance with a preferred embodiment of the present invention may be implemented.

Referring to FIG. 1a, a high-level block diagram of a microprocessor in which a preferred embodiment of the present invention may be implemented, is illustrated. Processor 120 is a single integrated circuit microprocessor. Accordingly, processor 120 includes various units, registers, buffers, memories, and other sections, all of which are formed by integrated circuitry. Processor 120 may be illustrative of microprocessors utilized in cellular phones, weapon systems controllers, data processing systems and other electronic devices requiring a computing function.

Processor 120 includes level one (L1) instruction and data caches 122 and 123 respectively. As shown in FIG. 1A, processor 120 is connected to system address bus 142 and to system data bus 144 via bus interface unit 126. In this example, the preferred embodiment is demonstrated in a data processing system. Also, the embodiment may refer to any other device, as indicated above, that utilizes a microprocessor to perform functions dictated by a logic program. Instructions are normally retrieved from system memory (not shown), in the case of a data processing system and transmitted to processor 120 through bus interface unit 126. Instructions are stored in instruction cache 124, while data retrieved through bus interface unit 126 is stored in data cache 123. Instructions are fetched as needed from instruction cache 122 by instruction unit 128, which includes instruction fetch logic, instruction branch prediction logic, an instruction queue and a dispatch unit.

The dispatch unit within instruction unit 128 dispatches instructions as appropriate to execution units such as integer unit 132, floating point unit 134, or load/store unit 136. Integer or "fixed-point" unit 134 performs add, subtract, multiply, divide, shift or rotate operations on integers, retrieving operands from and storing results in integer or general purpose registers ("GPR File") 138. Floating point unit 134 performs single precision and/or double precision multiply/add operations, retrieving operands from and storing results in floating point registers ("FPR File") 140.

In the present invention, registers within the microprocessor may be utilized to store data and/or instructions. During the manufacturing process, code may be loaded to registers within the microprocessor to provide an automatic disabling procedure that requires no initialization by a user. At completion of manufacturing the device, an installed interval timer is activated and logic stored in registers within microprocessor 120 is initiated providing the automatic disabling procedure.

The architecture depicted in FIG. 1A is provided solely for the purpose of illustrating and explaining an embodiment of the present invention, and is not meant to imply any architectural limitations. Those skilled in the art will recognize that many variations are possible and that all such variations are within the spirit and scope of the present invention.

Figure 2:
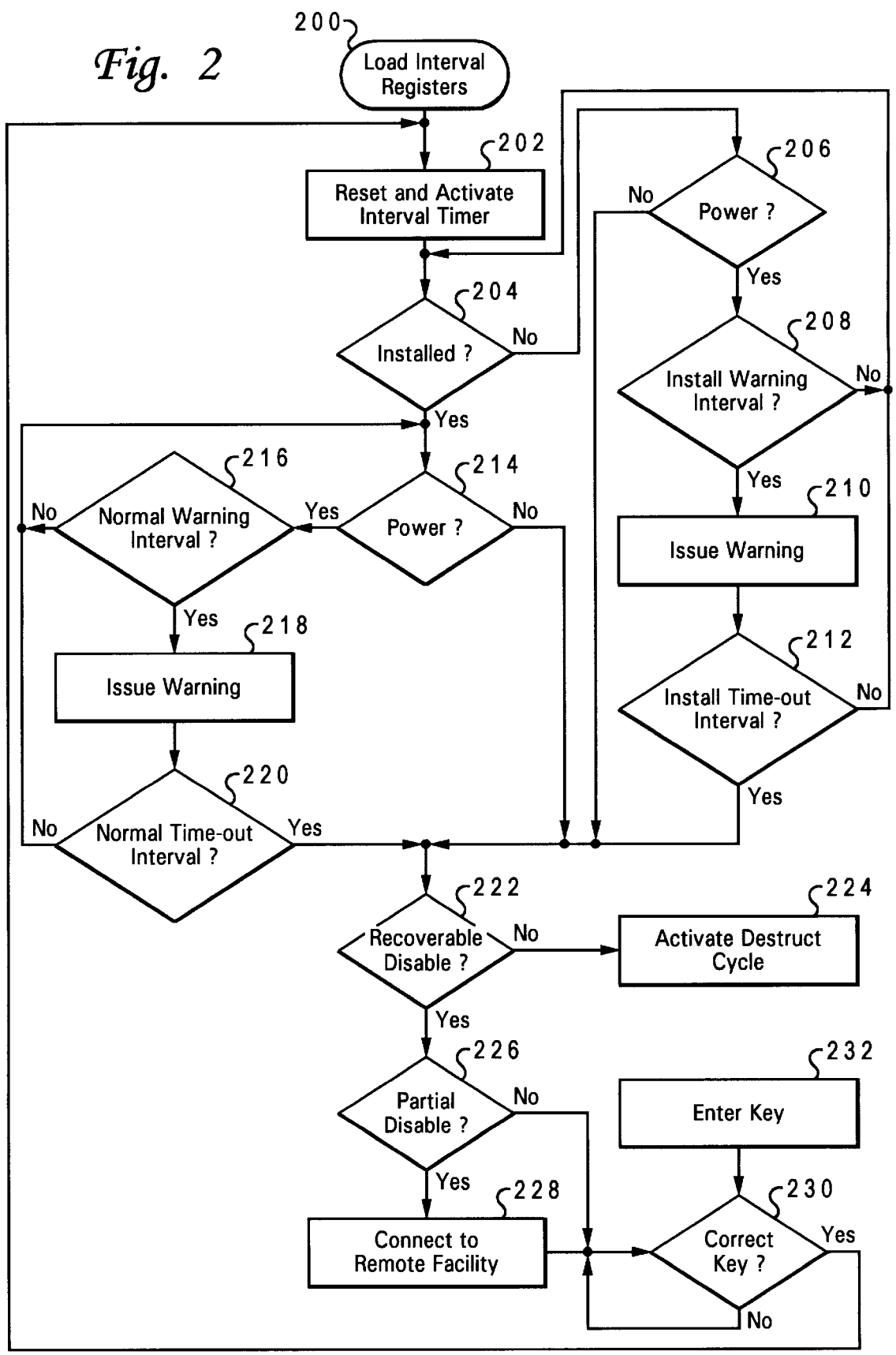
FIG. 2 is a high level flow chart of the process for providing integrated security for automatically disablement of a protected device in accordance with a preferred embodiment of the present invention.

Referring now to FIG. 2, a high level flow chart of the process for providing integrated security for automatically disabling a protected device in accordance with a preferred embodiment of the present invention, is illustrated. A data processing system will be used to illustrate the device protection process of the present invention. Equivalent steps, depending on the protected device, are utilized to provide automatic disablement. those skilled in the art will recognize that different devices have different means to accomplish the same result. For instance, a warning on a pending disablement of a cellular phone may be audible, whereas a warning for disabling a data processing system may be displayed on the system video terminal. As indicated above, variations of the method between different devices are within the spirit and scope of the present invention.

The process begins with step 200, which depicts loading designated interval registers, during the manufacturing process, with timing logic for controlling integrated security measures. Timing logic comprises: installation warning interval, installation time-out interval, normal warning interval and normal time-out interval. The process proceeds to step 202, which illustrates activating an onboard interval timer employed with the logic for automatically disabling the protected device. Next, the process passes to step 204, which depicts a determination of whether or not a protected device (in the present embodiment, a data processing system) has been installed at a purchaser's location. If not, the process passes to step 206, which illustrates the logic checking for power. If there is no power, the process proceeds to step 212 and enters a disablement sequence beginning with step 222. If power is present, the process instead passes to step 208, which depicts a determination of whether the installation warning interval has expired. If not, the process returns to step 204 to continue checking for installation.

If the install warning interval has expired, the process instead proceeds to step 210, which illustrates logic causing a warning to be issued, which may be audible or visually displayed. The process then passes to step 212, which depicts a determination of whether the install time-out interval has expired. If not, the process returns to step 204. If the interval has expired, the process proceeds instead to the disablement sequence in step 222.

Returning to step 204, if the determination is made that the computer has been installed at the purchaser's location, the process instead proceeds to step 214, which illustrates a determination of whether power has been removed or expired. If the power source is not providing power to the interval timer, the process proceeds to step 222 and enters a disablement sequence. If power is available, the process instead passes to step 216, which depicts a determination of whether the normal warning interval has expired. If the warning interval has not expired, the process returns to step 214. If the normal warning interval has expired, the process then passes to step 218, which illustrates issuing a disablement warning. The process then continues to step 220, which illustrates a determination of whether the normal time-out interval has expired. If not, the process returns to step 214. If the time-out interval has expired, the process instead passes to step 222, which illustrates a determination of whether the disablement sequence selected is recoverable. If not, the process proceeds to step 224, which illustrates logic activating the circuit destruction cycle. This cycle is irreversible and circuit destruction will cause fusible links to destruct and permanently disable the device.

If the determination is made that the pre-selected disablement sequence is recoverable, the process passes instead to step 226, which depicts a determination of whether the selected disablement sequence is a partial disablement. If not, the process proceeds to step 230. If, in step 226, the determination is made that the partial disablement sequence has been selected, the process next proceeds to step 228, which depicts the protected device connecting to a remote facility to obtain a reset key. The process then passes to step 230, which illustrates a determination of whether a correct key has been entered. If the correct key has been entered, as depicted, in step 232, the process returns to step 202. If the correct key has not been entered, the process returns to step 230 and repeats until the correct key has been entered. Logic may be set to limit the number of key entries.

Normally, power would be required to maintain security on an electronic device. Installation time-outs cannot be performed without system power and registers. Generally, compare logic and status register(s) must be powered to avoid loss of installation time-out interval while device/system is being shipped or stored prior to installation. In the present invention, the time-out occurrence is latched up in a status register, which the device/system will detect after it is powered up and the pre-selected disablement sequence will be enabled. Thus, power removal or absence of power will not hinder protection of the device/system.

It is important to note that while the present invention has been described in the context of a fully functional data processing system, those skilled in the art will appreciate that the logic portion of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for automatic disablement of a protected device, comprising the steps of:
   loading logic into specified registers, during manufacture of said device, wherein said logic:
      detecting pre-defined time intervals; and
      detecting an absence of battery power to said interval timer within said device;
   activating said timer during manufacture of said device;
   warning a user of deactivation of said device without entry of a pre-set authorization code; and
   deactivating said device absent a timely entry of said code.

2. The method of claim 1, wherein installing said interval timer in said device, further comprising:
   providing said timer with a battery for uninterrupted operation; and
   allowing said timer to be reset utilizing said pre-set authorization code.

3. The method of claim 1, wherein loading said logic including pre-defined time intervals into specified registers during manufacture of said device, further comprising:
   including conditions for deactivating said device into either of three pre-set states;
   providing conditions for determining whether or not power to said interval timer has ceased;
   preventing deactivation by allowing said logic to receive said pre-set authorization code; and
   resetting said time interval to prevent deactivation.

4. The method of claim 1, wherein activating said timer during manufacture of said device, further comprises:
   determining time intervals to be measured by said logic;
   pre-setting time intervals within said logic; and
   connecting a battery to said device for providing power to said registers for uninterrupted operation.

5. The method of claim 3, wherein provisions for deactivating said device into either of three pre-set states, further comprise;
   partially deactivating said device while allowing said device to connect to a remote service site to receive said authorization key to reactivate device;
   fully deactivating said device and requiring entry of said authorization key to reactivate device; and
   destructively deactivating said device by destroying circuits necessary for device operation.

6. An apparatus for automatic disablement of a protected device, comprising:
   means for loading logic into specified registers during manufacture process of said device, wherein said logic:

pre-defined time intervals; and logic for detecting absence of battery power to an interval timer within said device;

means for utilizing said timer during and after said manufacturing process;

means for warning a user of deactivation of said device without entry of a pre-set authorization code; and means for deactivating said device absent a timely entry of said code.

7. The apparatus of claim 6, wherein said interval timer, further comprises;

a battery for uninterrupted operation; and a reset means for utilizing said pre-set authorization code.

8. The apparatus of claim 6, wherein specified registers contain said logic with said logic including pre-defined time intervals and logic for detecting absence of battery power to said interval timer, further comprises;

means for utilizing said logic to deactivate said device into either of three pre-set states;

means for determining whether or not power to said interval timer has ceased;

means for preventing deactivation by allowing said logic to receive said pre-set authorization key; and means for resetting said time interval to prevent deactivation.

9. The apparatus of claim 6, wherein registers containing logic for utilizing said timer during and after manufacturing process, further comprises:

means for comparing pre-determined time intervals to time intervals supplied by said interval timer; and a battery connected to said device for providing power to said registers for uninterrupted operation.

10. The apparatus of claim 8, wherein said device may be deactivated into either of three pre-set states, further comprises;

means for providing a partially deactivated state, wherein said device may connect to a remote service site to receive an authorization key to reactivate said device;

means for providing a fully deactivated state, wherein said device may require entry of said authorization key to reactivate said device; and means for providing a destructively deactivated state, wherein vital circuits necessary for operation of said device are destroyed.

11. A computer program product within a computer readable medium with instructions for automatic disablement of a protected device, comprising:

instructions within said computer readable medium for loading logic, including pre-defined time intervals, into specified registers during manufacture of said device;

instructions within said computer readable medium for comparing said time intervals to time periods generated by an interval timer within said device;

instructions within said computer readable medium for warning user of deactivation of said device without entry of a pre-set authorization code; and instructions within said computer readable medium for deactivating said device absent a timely entry of said code.

12. The computer program product of claim 11, further comprises;

instructions within said computer readable medium for allowing said timer to be reset utilizing said pre-set authorization code.

13. The computer program product of claim 11, wherein instructions for loading said logic including pre-defined time intervals into specified registers during manufacture of said device, further comprises;

instructions within said computer readable medium for including provisions for deactivating said device into either of three pre-set states;

instructions within said computer readable medium for providing conditions for determining whether or not power to said interval timer has ceased;

instructions within said computer readable medium for preventing deactivation by allowing said logic to receive said pre-set authorization key; and instructions within said computer readable medium for resetting said time interval to prevent deactivation.

14. The computer program product of claim 11, wherein instructions for activating said timer during manufacture of said device, further comprises:

instructions within said computer readable medium for determining time intervals to be measured by said logic; and instructions within said computer readable medium for pre-setting time intervals within said logic.

15. The computer program product of claim 13, wherein instructions for provisions to deactivate said device into either of three pre-set states, further comprise;

instructions within said computer readable medium for partially deactivating said device while allowing said device to connect to a remote service site to receive said authorization key to reactivate said device;

instructions within said computer readable medium for fully deactivating said device and requiring entry of said authorization key to reactivate said device; and instructions within said computer readable medium for destructively deactivating said device by destroying circuits necessary for device operation.

* * * * *